United States Patent [19]

Dallas

[11] 3,845,562
[45] Nov. 5, 1974

[54] METHOD AND APPARATUS FOR DETERMINING THE THICKNESS OF A GAP BETWEEN ELEMENTS

[75] Inventor: Charles G. Dallas, Westville, N.J.

[73] Assignee: Mobil Oil Corporation, New York, N.Y.

[22] Filed: Aug. 16, 1973

[21] Appl. No.: 388,877

[52] U.S. Cl. ....... 33/169 R, 33/180 A T, 33/DIG. 8
[51] Int. Cl. .............................................. G01b 5/14
[58] Field of Search .......... 33/168 R, 169 R, 169 C, 33/169 B, 143 R, 178 B, 180 AT, 169 F, 148 G, 180 R, 181 R, DIG. 8, 174 A

[56] References Cited
UNITED STATES PATENTS 2,546,990 6/1949 Euverard ......................... 33/169 F
3,501,842 3/1970 Beasley ............................ 33/174 A Primary Examiner—Louis R. Prince
Assistant Examiner—Willis Little
Attorney, Agent, or Firm—Andrew L. Gaboriault; Carl D. Farnsworth

[57] ABSTRACT

A method and apparatus used for setting the side seal end gap with the corner seal of a rotary engine is described. The apparatus used comprises a micrometer instrument consisting of a cylindrical rod sized to the corner seal aperture and provided with a gradually increasing cam section spaced from the rod and acquiring its maximum thickness in 180°. The cam is sized to measure tolerances up to a total amount up to 0.010 inch in increment of at least 0.005 inch.

1 Claim, 4 Drawing Figures

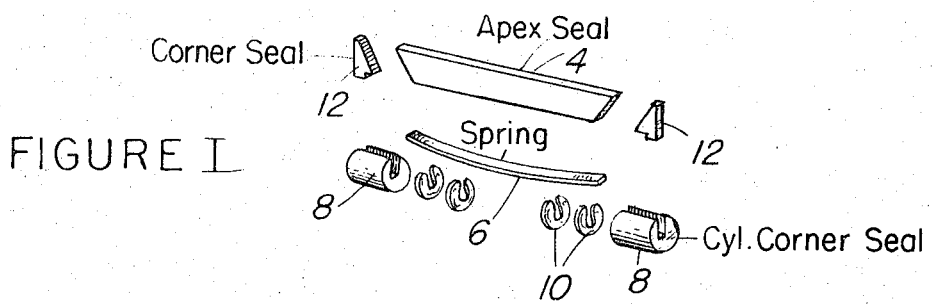
FIGURE I
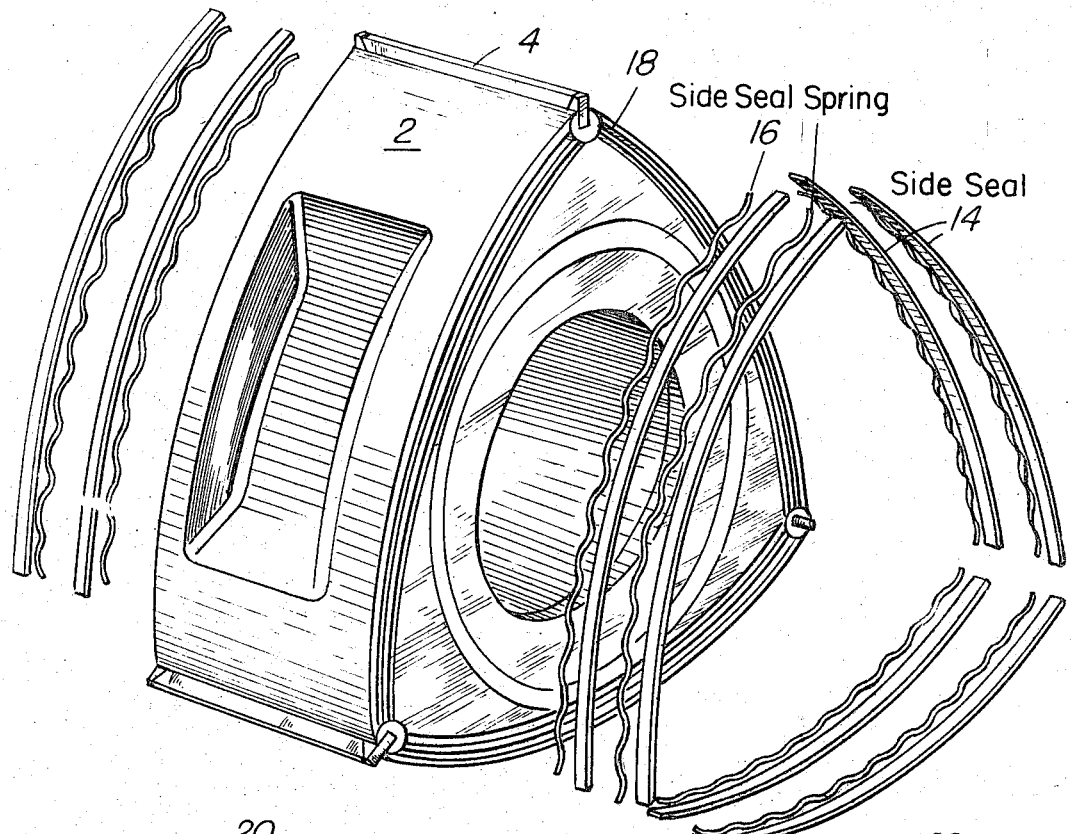
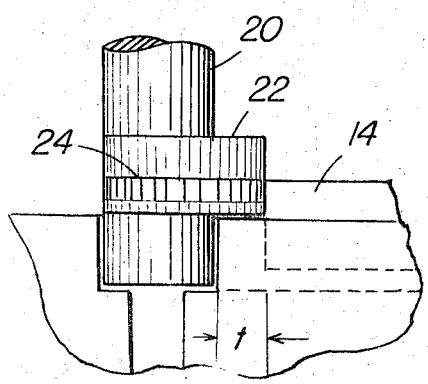
FIG. II
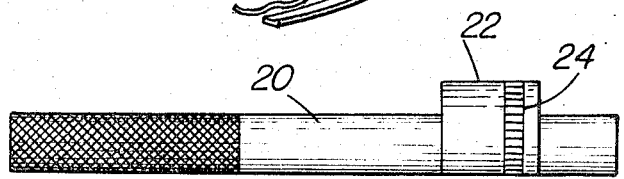
FIG. III
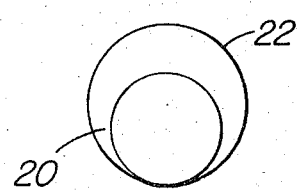
FIG. IV

METHOD AND APPARATUS FOR DETERMINING THE THICKNESS OF A GAP BETWEEN ELEMENTS

BACKGROUND OF THE INVENTION

In a rotary engine of the Wankel type, the gas tightness of the working chamber is maintained by preventing gas leakage through the gap between the rotor apex and the trochoid surface of the rotor housing and the gap between the side of the rotor and the surface of the side housing. To accomplish this necessary sealing an apex seal is installed in a groove in each apex of the rotor in combination with arc-shaped side seal used on each side of the rotor and between each apex. Two side seals in parallel may be used. At the intersecting joint of these seals there is provided a cylindrical corner seal. During operation of the rotary engine it is important that the arc-seal in the rotor face be sized length-wise to avoid undesired pressure contact with the cylindrically shaped corner seal. The present invention is particularly directed to the method and means for measuring and setting the arc-shaped side seal end tolerances to avoid pressure contact with the corner seals particularly during operating temperature conditions.

SUMMARY OF THE INVENTION

The present invention is concerned with a rotary engine of the Wankel type. It is concerned particularly with maintaining the gas tightness of the working chamber by seal means restricted to very close tolerances.

More particularly the present invention is concerned with the method and means for obtaining desired end tolerances between the arc-shaped side seal and the corner cylindrical seal of the rotor. In a more particular aspect the present invention is concerned with the design and structure of a micrometer gauge or instrument suitable for accurately measuring the end gap between the arc-shaped side seal means and the cylindrical corner side means.

In a rotary combustion engine of the Wankel type, the clearance or end tolerance between one end of the arc-shaped side seal and a corner cylindrical seal to allow temperature induced expansion of the side seal during operating temperature conditions is restricted to within relatively narrow limits with the range of about 0.0005 to 0.001 of an inch. Obtaining such close tolerance with a high degree of accuracy is most difficult and time consuming. To facilitate this operation, a special micrometer tool is provided which is both accurate and simple to use without compromising in obtaining and maintaining tolerances desired. The micrometer tool or instrument more specifically discussed below comprises a metal rod of a diameter which will snugly fit into the corner seal cylindrical aperture and which is provided with a cam shaped proturbence or raised section spaced from the end of the rod so as to engage only the end of said side seal outside of said cylindrical aperture. The cam-shaped proturbence on the rod is sized to provide through 180° in increments of at least 1/1000 of an inch to a maximum thickness of 0.010 of an inch so that tolerances between the end of the side seal and the side of the cylindrical corner seal can be determined at least between 0.001 inch up to 0.010 inch. Thus by placing a properly sized rod with cam as above described in the cylindrical corner aperture, the tolerance between the end of the side seal and the cylindrical aperture can be quickly determined by rotating the rod within the cylindrical aperture until the cam section comes in contact with the end of the side seal and thereafter reading from the graduated cam provided with a suitable thickness indicating scale, the thickness of the gap between the end of the side seal and the cylindrical aperture measured by the cam. The above method of determining the end tolerance of the side seal is accomplished by placing the opposite end of the side seal up against its cylindrical corner seal.

BRIEF DESCRIPTION OF THE DRAWINGS

FIG. I diagrammatically shows the relationship of arc-side seal, apex seal and cylindrical corner seal as used with the rotor of a rotary engine.

FIG. II diagrammatically shows in more specific detail the relationship of side seal to the cylindrical corner seal and positioning of the micrometer to determine the tolerance therebetween.

FIG. III is a side view of the micrometer gauge of this invention.

FIG. IV is an end view of the micrometer gauge of this invention.

Referring now to FIG. I there is shown a rotor 2 for a rotary engine with an apex seal 4 and seal spring 6, a cylindrical corner seal 8 with seal spring 10, a corner seal 12, side seals 14 and side seal springs 16. The side seal 14 being an arc-shaped seal fits with spring 16 into the arc-shaped groove 18 in the side surface of the rotor.

In the arrangement of FIG. II, arc enlargement of the corner cylindrical seal as related to the side seal in cross-section is particularly diagrammatically shown to show the relationship of these components with the micrometer gauge and instrument used to determine the end tolerance $t$ between the end of side seal 14 and the cylindrical aperture for corner seal 8. In this arrangement a cylindrical rod 20 sized to form the cylindrical aperture and provided with a graduated cam 22 provided with scale 24 is rotated within the cylindrical aperture until the cam touches the end of seal 14. At this point of touching or contact the scale is read to determine the distance through which the cam is rotated to come in contact with the end of the side seal. The thickness may be directly read from the scale on the cam thus determining the end tolerance available when the opposite end of the side seal is against its cylindrical corner seal as herein discussed.

In FIG. III a side view of the micrometer gauge used in FIG. II is shown. This micrometer instrument may be of substantially any esthetic shape as long as it is provided with a smooth end portion sized to fit in the cylindrical aperture at the rotor apex as shown on FIGS. I and II and provided with a graduated cam portion of a size providing a maximum thickness of 0.010 inch through 180°. Preferably the cam has a graduating thickness which will permit determining the gap between two surfaces in at least thousandth of an inch. The surface of the cam through the 180° rise may be graduated into 10, 20 or more equal segments which radially indicate a change in thickness amounting to a very small fraction of an inch. In the specific arrangement of FIG. III a cylindrical rod 20 of 0.4323 inch diameter corresponding to the cylindrical corner seal aperture of a Toya Kogya 12A engine is provided with a cam 22 of a diameter of 0.444 inch arranged to be flush on one side with rod 20 and provided with a scale 24 as shown. The end of the rod opposite from the cam end may be knurled or otherwise roughened to facilitate handling.

FIG. IV shows a cross-section of FIGS. II and III showing the relationship between the rod means 20 of a diameter of 0.4323 inch and the cam means 22 of a diameter of 0.444 inch arranged to provide the cam of graduating thickness desired by the concepts of this invention.

Having thus provided a general discussion of the concepts of this invention and specifically discussed the method and means employed therein, it is to be understood that no undue restrictions are to be imposed by reason thereof except as defined by the following claims.

I claim:

1. A method for determining the thickness of a gap between the end of the side seal and its corresponding cylindrical corner seal positioned in the rotor of a rotary engine which comprises,
    a. setting one end of a side seal against its corresponding cylindrical corner seal,
    b. setting the cylindrical end of a micrometer gauge provided with a graduating circular cam spaced apart from said cylindrical end thereof in a cylindrical aperture in said rotor for said cylindrical corner seal at the opposite end of said side seal,
    c. rotating said micrometer gauge in said cylindrical aperture until the surface of said graduating cam engages the end of said side seal and
    d. reading directly from said graduating cam the thickness of the gap between said cylindrical aperture and the end of said side seal.

* * * * *

PO-1050
(5/69)

UNITED STATES PATENT OFFICE
CERTIFICATE OF CORRECTION

Patent No. 3,845,562  Dated November 5, 1974

Inventor(s) CHARLES G. DALLAS

It is certified that error appears in the above-identified patent and that said Letters Patent are hereby corrected as shown below:

Line 9 (last line) of Abstract [57]

"0.005" should be --.0005--

Signed and sealed this 4th day of March 1975.

(SEAL)
Attest:

RUTH C. MASON
Attesting Officer

C. MARSHALL DANN
Commissioner of Patents
and Trademarks